United States Patent [19]

Haffner

[11] Patent Number: 4,792,228

[45] Date of Patent: Dec. 20, 1988

[54] POSITION ERROR SENSING AND FEEDBACK APPARATUS AND METHOD

[75] Inventor: James L. Haffner, Cincinnati, Ohio

[73] Assignee: Cincinnati Milacron Inc., Cincinnati, Ohio

[21] Appl. No.: 87,693

[22] Filed: Aug. 20, 1987

[51] Int. Cl.$^4$ ............................................. G01B 11/27
[52] U.S. Cl. ................................... 356/138; 356/152; 356/364; 356/400
[58] Field of Search ............... 356/138, 152, 153, 399, 356/400, 364; 901/47

[56] References Cited

U.S. PATENT DOCUMENTS

| | | | |
|---|---|---|---|
| 3,582,215 | 6/1971 | Cornillault | 356/400 X |
| 4,468,119 | 8/1984 | Hamar | 356/138 X |
| 4,618,759 | 10/1986 | Muller et al. | 219/121 LR |

FOREIGN PATENT DOCUMENTS 163866  12/1981  Japan ................................. 356/138

OTHER PUBLICATIONS

"Laser Tracking System to Measure Robot Arm Performance", by J. H. Gilby and G. A. Parker, Oct. 1982, Sensor Review.

"Robotest Measuring System", by Polytec, Polytec Optronics, Inc., Product Brochure and Preliminary Information Document.

"Robot Accuracy Issues and Methods for Improvement", by Dr. Chia P. Day, 17th Int'l. Symposium on Industrial Robots, Apr. 26-30, 198.

"Robot Testing and Evaluation", by Albert J. Strum and Ivor Matz, Dec. 1986—Robotics Engineering.

"Industrial Robot Forward Calibration Method and Results", by D. E. Whitney et al., Mar. 1986, vol. 108, Journal of Dynamic Systems.

"Coordinate Measurement with a Tracking Laser Interferometer", by L. G. Brown et al., Oct. 1986, Lasers & Applications.

*Primary Examiner*—Davis L. Willis
*Assistant Examiner*—Matthew W. Koren
*Attorney, Agent, or Firm*—Frost & Jacobs

[57] ABSTRACT

There is provided a position error sensing and feedback apparatus and method for a positioning device having a working piece which is moved along a rectilinear triordinate system. The apparatus comprises a laser source for providing a highly polarized laser beam which is directed substantially parallel to a first of the axes of the triordinate system. In a preferred embodiment, a first laser beam processing package is located along such first axis for receiving the laser beam and splitting such beam into a first portion which is directed outwardly along a path substantially parallel to a second axis of the triordinate system, with the remaining portion directed to at least one error detector means for measuring positional and orientational errors of the first processing package relative the laser beam. A second laser beam processing package is located along the second axis for receiving the first portion of the laser beam and further splitting it into a second portion which is directed outwardly along a path substantially parallel to the third axis of the triordinate system, and directing the remaining portions of the beam to at least one error detector for measuring positional and orientational errors of the second processing package relative the laser beam. A third laser beam processing package is located along the third axis of the triordinate system for receiving the second portion of the laser beam and directing portions thereof to a plurality of error detectors for measuring positional and orientational errors of the third processing package relative the second portion of the laser beam. A feedback processor is provided for communicating the detected translational, angular and rotational deviations to a control unit of the rectilinear positioning device to enable selective correction thereof.

31 Claims, 6 Drawing Sheets

POSITION ERROR SENSING AND FEEDBACK APPARATUS AND METHOD

TECHNICAL FIELD

This invention relates to a position error sensing and feedback apparatus for a positioning device having a working piece which is moved along a rectilinear triordinate system, and, more particularly, to such a device which can provide continuous error sensing and feedback to a positioning device, such as a gantry robot which moves its working piece within a mutually perpendicular three axis system, to enable correction of translational, angular and rotational deviations of such working piece to thereby provide improved positional accuracy and performance.

BACKGROUND ART

The importance of accuracy and repeatability of movements of various positioning devices such as robots, coordinate measuring systems and the like has been recognized for many years, and especially since the development and rapidly expanding use of robotic manipulators and the like in recent years. As technology advances, users of the various positioning devices require increasingly sophisticated and precise performance and dependability.

For example, gantry-type robots and similar positioning devices for robotic or coordinate measuring systems increasingly demand more accuracy for various manufacturing and placement tasks such as welding, assembling, palletizing, etc. The accuracy and repeatability of movements within such systems depend generally on the control system's capabilities, and the resultant performance is clearly degraded by undetectable and/or uncorrected positional errors. Factors contributing to robot inaccuracy include imprecision in robot parameters such as roundoff errors imposed by limited capacity digital control units, imperfect guideways and pathways of the positioning device, bowing, non-planarity, runout and Abbe errors, additive tolerance or tolerance stackup errors, mismatched drive structures, squareness errors, deflection of various structures, non-uniformity of adjacent axes, resonance or natural vibration errors, environmental factors such as temperature and humidity, and the like. All of such imperfections and factors tend to cause angular orientation errors as well as linear translation errors of the position within the rectilinear triordinate system of the working piece of a particular positioning device.

In accordance with the widespread recognition of the need for improved accuracy and repeatability of positioning devices, numerous and various endeavors have been undertaken to respond to the various causes of positional errors. For example, quality inspection with particular attention to accuracy can reduce errors in manufacturing and assembly, and maintaining a predetermined environment can also help provide more consistent robot accuracy. Additionally, various calibration methods utilizing reference matching techniques can generally improve robot accuracy at a particular point in the robot work space. In particular, calibration is a procedure wherein zero reference positions are established at various robot joints in order to command accurate robot moves in cartesian frames. Normally, a predetermined robot pose is selected, and thereafter, a record command is issued to establish a common reference between encoder values and actual joint values in the robot. Upon set-up of the robot, the zero reference positions can be established using a calibration fixture or mastering fixture, which provides reference for the zero angles at the robot joints, and can also determine adjustments needed on various parts of the robot. However, such calibration/mastering is often a tedious manual process which can help establish accuracy at only one particular position in the robot workspace. Moreover, recalibration of the device is often necessary on a periodic basis, and accuracy can only be assured for a short time period following such recalibration.

Another method utilized to minimize certain predictable errors is known as the open-loop method wherein, based upon some predetermined information about the particular robot and factors contributing to its inaccuracy, the open-loop method supplies compensated commands to the robot so that the workpiece accuracy can be improved. In particular, the open-loop method entails collecting measurements of robot movements, modeling such movements to derive compensated commands, and sending such compensated commands to the robot to improve the accuracy of its movement. The measurement and modeling steps of this method are completed in an off-line manner by comparing the workpiece positions measured by an external sensor with robot positions as commanded by the robot controller. Such information is then processed in modeling algorithms and the like to obtain actual errors in the robot's accuracy. Such errors are then fed into the robot controller so that compensated commands can be issued to the robot during on-line operations. It is recognized, however, that the data collection in the open-loop method is a relatively tedious task, and that compensated commands are only as good as the modeling techniques utilized to derive them.

Realizing the inherent problems with the open-loop system, an alternative known as a closed-loop method has also been studied. In such a method, a laser tracking system measures the robot workpiece position, and these position inputs are fed back to the robot control system and compared to robot parameters previously identified in much the same way as described above for the open-loop method. In this way, compensated commands can be derived and supplied to the robot constantly. Such a system, however, is dependent upon the interaction of a plurality of laser tracking systems which must be integrated with each other and with the robot controller. Additionally, only limited translational and angular deviations can be detected and compensated for in such system, and the freedom of movement within the workstation is restricted by the need to maintain the laser beam transmission pathways clear at all times.

An example of a calibration-type system for use with robots is embodied in the measuring system known as "ROBOTEST" available from Polytech Optronics, Inc. of Costa Mesa, California. In particular, the Polytech ROBOTEST measuring tool is used to determine the precision of industrial robots and machine tools. The ROBOTEST device includes a laser interferometer, an optical sensor head with position-sensitive diodes, and a signal processor linked to a data processing computer. This system measures the ability of a robot to reproduce a single position in space, and the ability of the robot to trace a perfect straight line under load and at normal operating speeds. The interferometer measures the linear position of the robot working piece along a reference axis Z, while a separate laser is utilized to define the perfect straight line to be tested, and position-sensitive diodes measure deviations from that straight line. While this system could be a valuable tool for testing and verifying robot motion, it is designed for testing the motion of a robot along a single axis or line, is designed for testing purposes as opposed to continuous integral feedback operation with a working robot, and requires the use of two laser beams to determine roll errors about the axis of motion. Moreover, even if it were adapted for continuous use, the ROBOTEST system is prohibitively expensive to incorporate into each robot.

An arrangement for compensating for offset and angular errors of a laser utilized in a processing or measuring machine is shown in U.S. Pat. No. 4,618,759, which issued to G. Muller et al. on Oct. 21, 1986. The Muller et al. system utilizes beam splitters to direct portions of a laser beam to be controlled to a quadrant detector optic which measures translational errors of the beam, and to a separate quadrant detector for measuring angular errors of the beam. These separate quadrant detectors generate error signals which are used to adjust a pair of servo-controlled mirrors to allegedly null out the translational and angular errors of the laser beam. However, the Muller et al. system is designed to determine and compensate for errors associated with only a single axis of motion, and, consequently, cannot easily be adapted to simultaneously measure the coupled errors of three axes of motion commonly encountered in a working robot. Moreover, the Muller et al. system does not account for roll error about the axis of the laser beam itself.

Consequently, while accuracy and repeatability characteristics of industrial robots and positioning devices in general has been widely recognized in the industry, heretofore there has not been provided an error detection and correction system for positioning devices having a working piece which is moved along a rectilinear triordinate system to enable correction of translational, angular and rotational deviations to improve the accuracy and repeatability of such device. Moreover, previous error sensing devices and techniques entail tedious measuring and modeling techniques, relatively expensive and cumbersome testing equipment, and/or fail to provide for simultaneous error sensing and feedback of movement within a rectilinear triordinate system.

DISCLOSURE OF THE INVENTION

It is an object of this invention to obviate the above-described problems, and the shortcomings of error detection and correction systems for positioning devices.

It is another object of the present invention to provide a position error sensing and feedback apparatus and rotational deviations of a positioning device having a working piece which moved along a three axis rectilinear system.

It is yet another object of the present invention to provide a position error sensing and feedback apparatus which can be integrated into a positioning device such that the error detection and correction capabilities can be utilized either intermittently or continuously during operation of the positioning device, without intefering with the otherwise normal operation thereof.

It is also an object of the present invention to provide a relatively inexpensive position error sensing and feedback apparatus which can be easily integrated into existing control systems for positioning devices to provide improved performance thereto.

In accordance with one aspect of the present invention, there is provided a position error sensing and feedback apparatus for a positioning device having a working piece which is moved along a rectilinear triordinate system. The apparatus comprises a laser source for providing a highly polarized laser beam of a predetermined wavelength, with such laser source being supported at a predetermined position relative the rectilinear positioning device. The laser beam provided by such laser source is fixably directed substantially parallel to a first of the axes of the triordinate system. In a preferred embodiment, a first laser beam processing package is located along such first axis for receiving the laser beam and splitting such beam into a first portion which is directed outwardly along a path substantially parallel to a second axis of the triordinate system, and the remaining portion to at least one error detector means for measuring positional and orientational errors of the laser beam at that package. A second laser beam processing package is located along the second axis for receiving the first portion of the laser beam and further splitting it into a second portion which is directed outwardly along a path substantially parallel to the third axis of the triordinate system, and directing the remaining portions of the beam to at least one error detector for measuring positional and orientational errors of the first portion of the laser beam at the second package. A third laser beam processing package is located along the third axis of the triordinate system for receiving the second portion of the laser beam and directing portions thereof to a plurality of error detectors for measuring positional and orientational errors thereof. Feedback structure is provided for communicating the detected translational, angular and rotational deviations to a control unit of the rectilinear positioning device to enable selective correction thereof.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Referring now to the drawings in detail, wherein like numerals indicate the same elements throughout the views, a positioning device (in this case a gantry-type robot system) 10 is illustrated as including a position error sensing and feedback apparatus 25 of the subject invention. Positioning device 10 is shown as comprising four spaced support members 11 surmounted by a pair of oppositely disposed bridge guides 12 and a pair of cross members 13 forming the superstructure of the device. Bridge member 14 itself comprises a pair of spaced, laterally extending bridge beams 15 which are integrally connected at their ends by the oppositely disposed members 20, which preferably include bearing supports 26 corresponding to the upwardly extending guiderails of bridge guides 12. Bridge 14 is thereby supported for reciprocating movement longitudinally along positioning device 10 in the X axis direction as shown in FIG. 1.

Telescopically mounted on bridge 14 is the vertical mast or Z-axis arm 16 having a working piece 17 at its lower distal end. Working piece 17 could comprise a tool holder or tool mounting surface, a robot wrist, a payload grasping device, or similar structure which is to be moved to particular desired points within the three axis rectilinear triordinate system of positioning device 10. Vertical mast 16 provides movement of such working piece 17 along the vertical or Z-axis of the triordinate system as shown in FIG. 1. Vertical mast 16 is further attached to bridge 14 such that it can be reciprocated laterally along the Y axis of the triordinate system of positioning device 10. In particular, vertical mast 16 is reciprocably mounted on bridge 14 by mounting yoke 21 such that mast 16 can be reciprocated vertically along the Z axis of the triordinate system, while mounting yoke 21 can be reciprocated laterally along the Y axis of the triordinate system by interaction of its yoke guides 22 with the corresponding guide rails 23 formed on the upper surfaces of bridge cross members 15. In this way, movement of working piece 17 is provided along a rectilinear triordinate system by positioning device 10.

The movement of working piece 17 is controlled by control unit 18 which is connected to positioning device 10 via control hookup 19. The drive units to reciprocate bridge 14 longitudinally along positioning device 10, as well as similar drive units for reciprocating vertical mast 17 relative mounting yoke 21 and for reciprocating mounting yoke 21 laterally along bridge cross members 15 are not shown in the figure, as such power input could be provided by any conventional means known in the industry for similar gantry-type robots. Likewise, the specific structure of positioning device 10 and the guide structures for enabling movement of working piece 17 along the rectilinear triordinate system is shown only as an example of the many ways in which these same results can be achieved. As mentioned, positioning device 10 includes a working piece (e.g. 17) which is moved along a rectilinear triordinate system, as indicated by the axes X, Y and Z of FIG. 1. Particularly, axes X, Y and Z are mutually perpendicular to one another, thereby providing a three dimensional coordinate system within which working piece 17 is translated.

Figure 1:
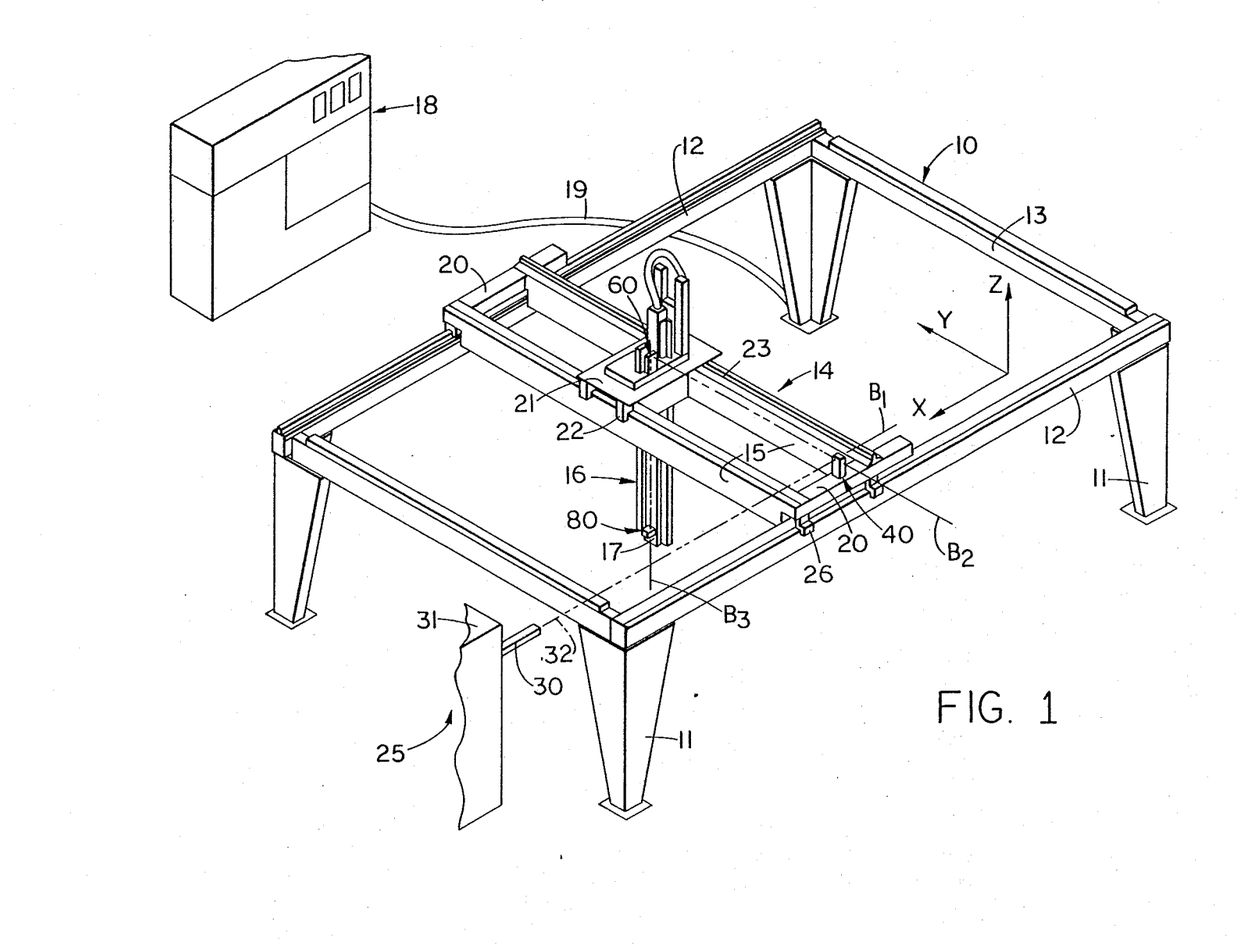
FIG. 1 is a perspective view of a gantry-type positioning device including a position error sensing and feedback apparatus of the subject invention.

FIG. 1 further illustrates position error sensing and feedback device 25 made in accordance with the present invention which is integrally arranged with positioning device 10. In particular, position error sensing and feedback device 25 comprises a laser source 30 which is preferably fixed on a mount 31 independent of positioning device 10. Laser source 30 is to provide a laser beam which will be directed from the supported laser source at a predetermined position relative to positioning device 10 along a transmission beam axis substantially parallel to one of the axes of the rectilinear triordinate system of positioning device 10. As shown in FIG. 1, it is preferred that laser source 30 direct its laser beam along a beam transmission axis $B_1$ substantially parallel to the X-axis of the triordinate system. Exact parallelism is not required as deviations will be adequately detected by the system. As will be seen from the discussion herein, the direction of the laser beam substantially parallel to one of the axes of the rectilinear system is preferred as a reference guideline to facilitate measurement and correction of angular and translation errors. All errors detected by the sensing and feedback device of the subject invention shall be determined relative the reference laser beam.

The laser beam 32 provided by laser source 30 is to be a highly polarized beam of predetermined wavelength (preferably of the He-Ne laser type). As will be described below, the polarization of laser beam 32 is critical for certain of the error detection capabilities of the subject system. The particular wavelength of the laser beam utilized must be known in order to ensure that proper optical focal lengths and the like can be chosen for the various error sensing optics utilized herein. It is preferred that the He-Ne laser beam have a wavelength of about 632.8 nm, although other types of laser beams and wavelengths could be utilized herein as desired. Laser beam 32 is preferably directed along bridge guide 12 parallel to the X axis of the triordinate system and along beam transmission axis $B_1$, as shown.

A first laser beam processing package 40 is located along beam transmission axis $B_1$ for receiving and processing beam 32. As shown best in the plan view schematic of FIG. 2, in a preferred embodiment first laser beam processing package 40 comprises a beam splitter 41 which provides means for splitting off a portion 33 of beam 32, and directing that portion 33 to error detector means for measuring positional and orientational errors of processing package 40 with respect to beam 32. The portion of laser beam 32 which is not directed to the error detector means within processing package 40 (hereinafter referred to as the first portion 59) passes through beam splitter 41 and into a pentaprism 58. Pentaprism 58 causes the first portion of the beam 59 to deviate by 90° independent of any translational, angular or orientational errors of the entering beam, and as long as pentaprism 58 is mounted within processing package 40 with zero pitch and roll, first portion 59 will exit pentaprism 58 along a beam transmission axis $B_2$ perpendicular to its original transmission axis $B_1$. In this way, first portion 59 of the laser beam is directed along a first portion transmission beam axis $B_2$ in a direction substantially parallel to theoretical axis Y of the triordinate system. While any means for directing first portion 59 of the laser beam long a path parallel to a second axis of the triordinate system could be utilized (e.g. single reflecting surface devices such as a mirror or right angle prism), pentaprism 58 is preferred because of its ability to deviate a beam by 90° independent of moderate changes in translation and yaw of the optic.

Figures 2, 3:
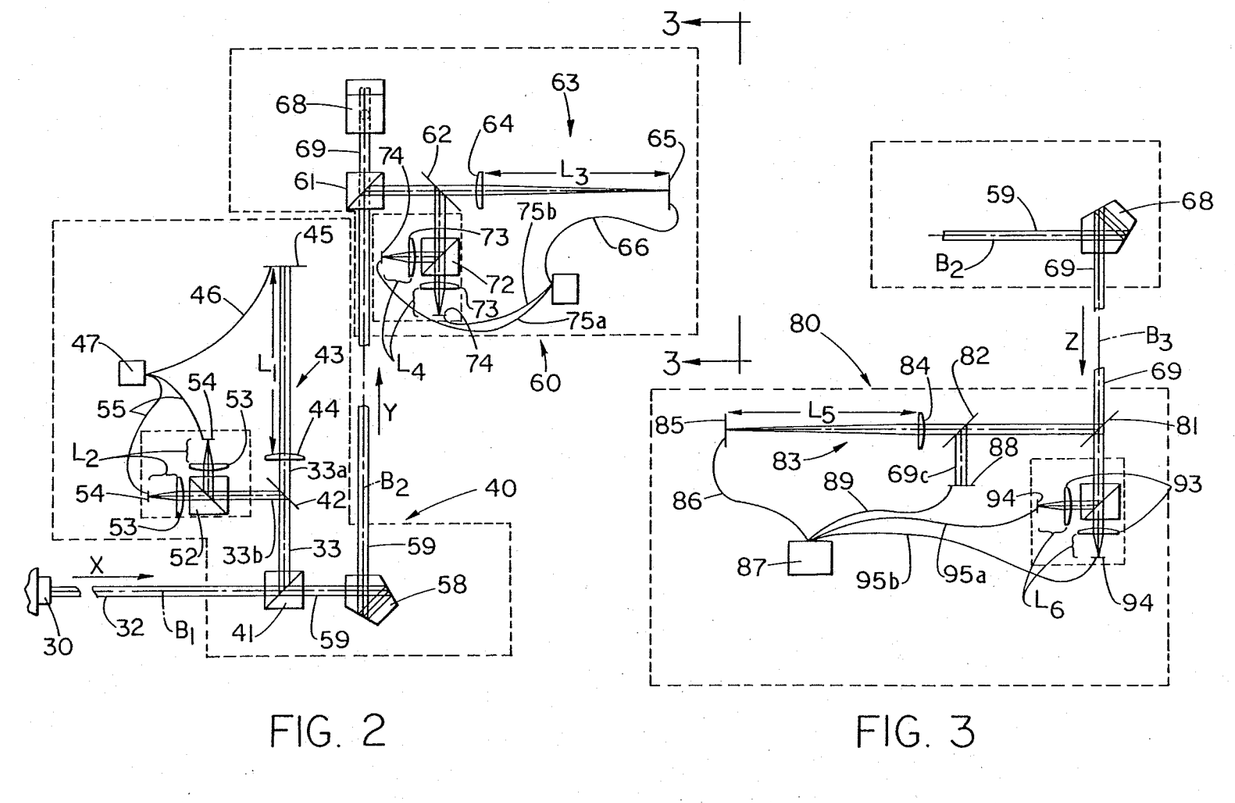
FIG. 2 is a plan view schematic depiction of the first two laser beam processing packages of the position error sensing and feedback apparatus illustrated in FIG. 1.
FIG. 3 is a side view schematic illustration of the third laser beam processing package of the error sensing and feedback apparatus shown in FIG. 1.
Figure 4:
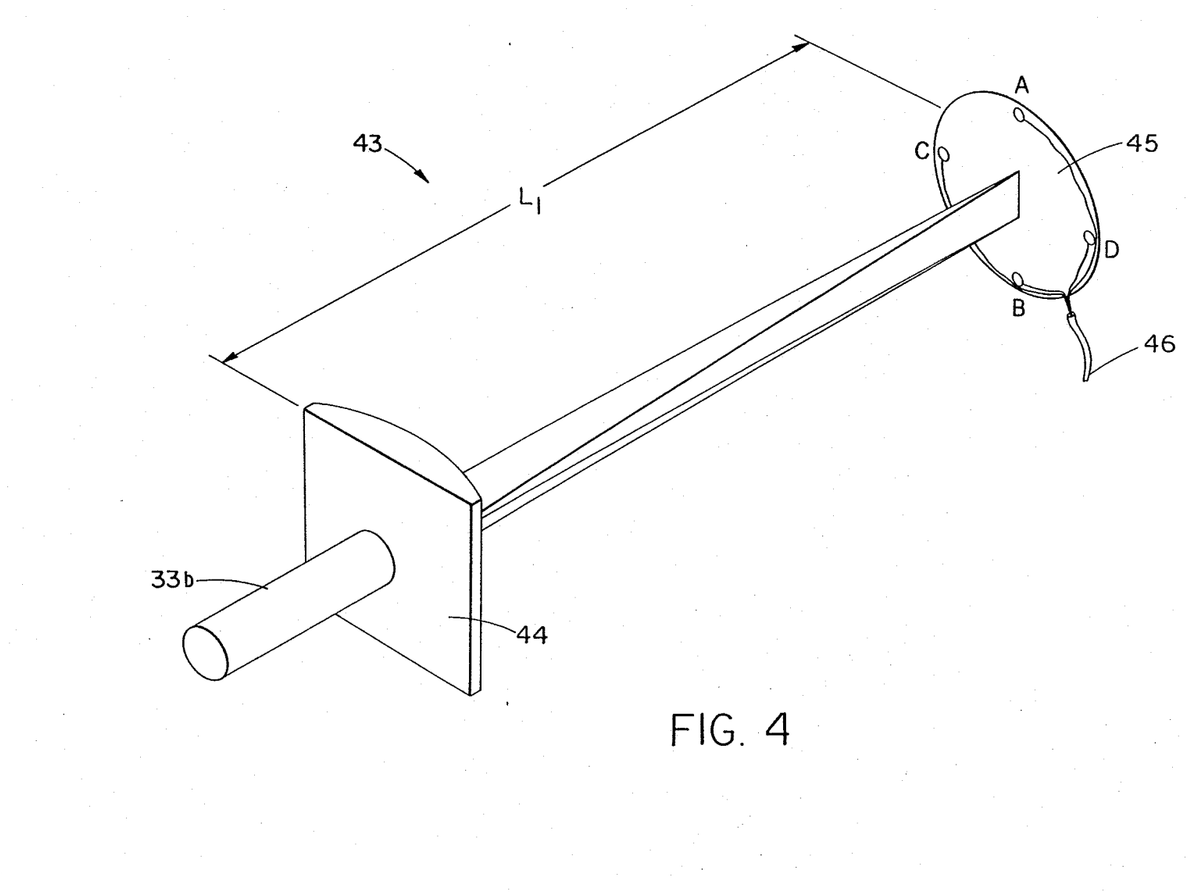
FIG. 4 is an enlarged perspective view showing details of an error detector optic which can be part of the laser beam processing packages of the subject invention.

The portion 33 of laser beam 32 split off by beam splitter 41 is preferably directed toward first error detector means 43 and second error detector means 50. In particular, portion 33 passes through a second beam splitter 42 which permits a subportion 33a of the beam to pass through to first error detector means 43, while a second subportion 33b is directed toward second error detector means 50. As shown in FIGS. 2 and 4, first error detector means 43 preferably comprises a cylindrical lens 44 which is spaced from a beam position sensor 45 at a predetermined length $l_1$. In particular, cylindrical lens 44 is preferably a long focal length lens, and beam position sensor 45 is placed at the focal point of lens 44, with such focal length being equal to $l_1$.

Position sensor 45 is preferably a dual axis position sensor or lateral effect photodiode having a series of 4 electrodes (i.e. A through D) equally spaced about its periphery. For example, lateral effect photodiode position sensors are available under the "SC" designation series from United Detector Technology. The focal length $l_1$ is of course chosen to correspond to the wavelength of the laser beam utilized in the system. First detector means 43 measures the translation of first processing package 40 in a plane perpendicular to the beam axis (in this case, axis $B_1$ parallel to the X axis of the triordinate system), and therefore is measuring the translation along the Y axis in this case. Additionally, first detector means 43 also measures angular deviation of first processing package 40 about an axis parallel to the Y axis. Since the beam is focused by lens 44 to eliminate translational deviation along the axis, only angular deviation about the Y axis is sensed along the axis defined by contact points C and D of sensor 45. The axis of sensor 45 defined by contact points A and B measures translational deviations along the Y axis coupled with angular deviations about the Z axis. With proper relative positioning of sensor 45, beam splitter 41, and pentaprism 58, the effects of the angular deviation about the Z axis on the sensor output can be reduced to negligible levels. Isolation of individual errors in this way simplifies the determination of required correctional commands to the positioning device by minimizing the required subsequent processing of such detected errors.

Any beam entering lens 44 parallel to the lens axis will be focused to a point on the axis, while any beam entering the lens 44 at an angle to the lens axis will be focused to a point offset from such axis. This offset is equal to the focal length ($l_1$) of lens 44 multiplied by the sine of the angle at which the beam is entering lens 44. Dual axis position sensor 45 has a photo-sensitive surface with electrodes A through D spaced about its peripheral edge, and light from the beam impinging the photodiode produces a photocurrent which is delivered to the four electrodes, and the current at each electrode is inversely proportional to distance from the light spot to that electrode. Input from these electrodes is relayed via feedback line 46 to feedback means 47 for first package 40 to a central control unit, and the data is therein manipulated to find the position of the optical spot on the plane of the detector. In this way, first error detector means 43 can simultaneously measure the translational error and angular error of laser beam 32 relative the Y axis of the rectilinear triordinate system. As indicated, these detected errors are fed back to a central control unit via feedback processing means 47. It is contemplated that feedback processing means 47 might perform the algorithms needed to isolate the pure error information discussed herein, or might alternatively simply relay the detected data to control unit 18 for processing.

Figure 5:
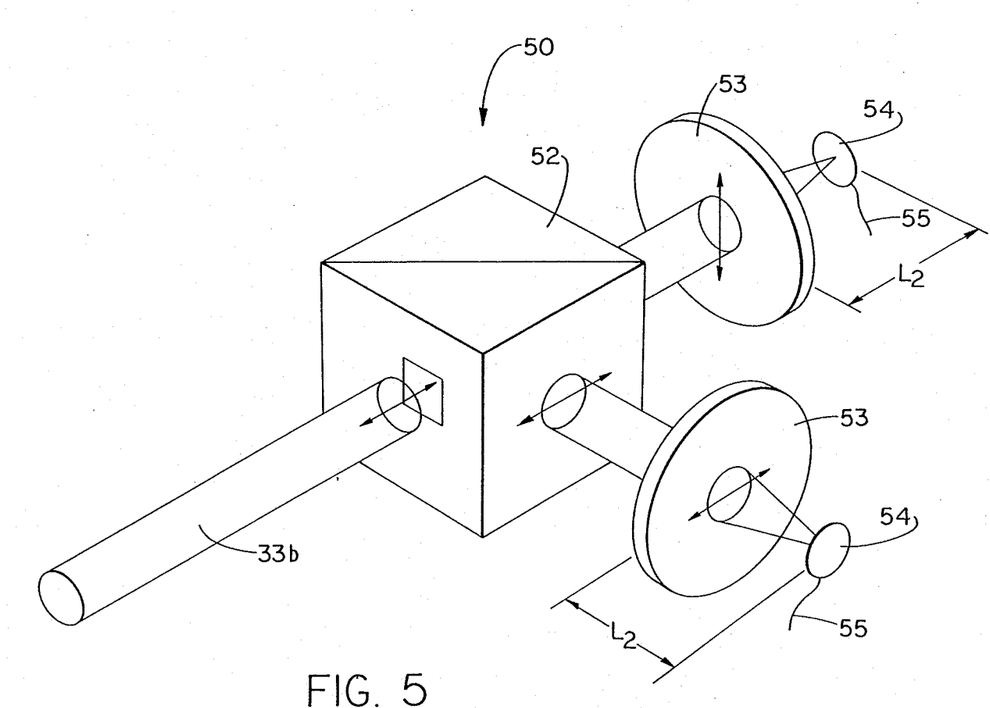
FIG. 5 is an enlarged perspective view of another error detector optic which can be utilized in the laser beam processing packages described herein.

The other subportion 33b of the laser beam is directed by beam splitter 42 to second error detector means 50 which further includes a polarizing beamsplitter 52 which divides subportion 33b of the beam into two equal portions which are directed to a pair of intensity sensors 54 through a corresponding pair of spherical lenses 53. Spherical lenses 53 are spaced from sensors 54 at their focal length $l_2$, wherein the two resulting beams impinge upon sensors 54, and the intensity of the beam light reaching such sensors will be determinable by the photocurrent generated by such light on sensors 54. The enlarged view of FIG. 5 shows additional details of how polarized beam 33b is directed through the pair of spherical lenses 53 toward sensors 54. Information detected on the sensors 54 is fed back to a central control unit wherein it is processed to determine the amount of roll error present in laser beam 32 about its axis $B_1$ of transmission. Particularly, the polarization of laser beam 32 is used to determine the amount of roll of such beam about axis of transmission $B_1$ by comparing the intensity of light detected on each of the sensors 54. The intensity of the light on each sensor 54 is proportional to the laser beam intensity multiplied by the square of the cosine of the angle of polarization of the laser beam entering beam splitter 52. By knowing the wavelength and polarization of laser beam 32, the roll error of laser beam 32 at first processing package 40 can be determined.

First portion 59 of laser beam 32 is directed by pentaprism 58 from first laser beam processing package 40 along a known transmission path $B_2$. Path $B_2$ will be parallel to the second axis (Y) of the triordinate system of positioning device 10 if the angular deviations of processing package 40 about the X and Z axes are zero. Any deviations of $B_2$ from parallel will be known since they are proportional to the measured deviations of processing package 40 about the X and Z axes.

A second laser beam processing package 60 is located along transmission axis $B_2$ and the Y axis of the triordinate system for receiving the first portion 59 of the laser beam directed from first package 40. As seen best in the schematic of FIG. 2, second processing package 60 comprises a beam splitter 61 which permits a second portion 69 of the beam to pass through and into a second pentaprism 68, while directing another portion of first beam portion 59 toward error detector means for measuring positional and orientational errors of beam 59.

In particular, the error detecting means of second processing package 60 preferably includes a third detector means 63 (substantially identical to first detector means 43 described above) for measuring translational and angular errors of first portion 59 of the laser beam relative the Z axis of the triordinate system; as well as a fourth detector means 70 comprising components substantially identical to those described above with regard to second detector means 50 for measuring the roll error of first portion 59 of the laser beam about its transmission axis $B_2$. In this regard, third detector means 63 includes a spherical lens 64 spaced at its focal length $l_3$ from dual axis position sensor 65. Spherical lens 64 focuses the entering beam toward sensor 65 to isolate translational and angular deviations being sensed thereon to a single axis (in this case the Z axis) of the triordinate system. In this way, position sensor 65 will be measuring the translational and angular deviations or errors of first portion 59 of the laser beam purely relative to axis Z of the triordinate system. As indicated above, by isolating particular deviations in this way, the pure errors can be fed back to a central control unit, and determination of correctional commands can be facilitated.

Fourth detector means 70 includes a polarizing beam splitter 72, and a corresponding pair of spherical lenses 73 and intensity sensors 74, respectively spaced at focal lengths $l_4$. As described with regard to second detector means 50 above, fourth detector means 70 utilizes the polarized nature of laser beam 32 to determine beam roll error of first portion 59 of the laser beam about its axis of transmission $B_2$, which is parallel to the Y axis of the triordinate system. Feedback lines 66 and 75a and b connect the third and fourth detector means 63 and 70, respectively, to feedback processing means 67. Feedback means 67 communicates with control unit 18 in a preferred arrangement.

Figure 7:
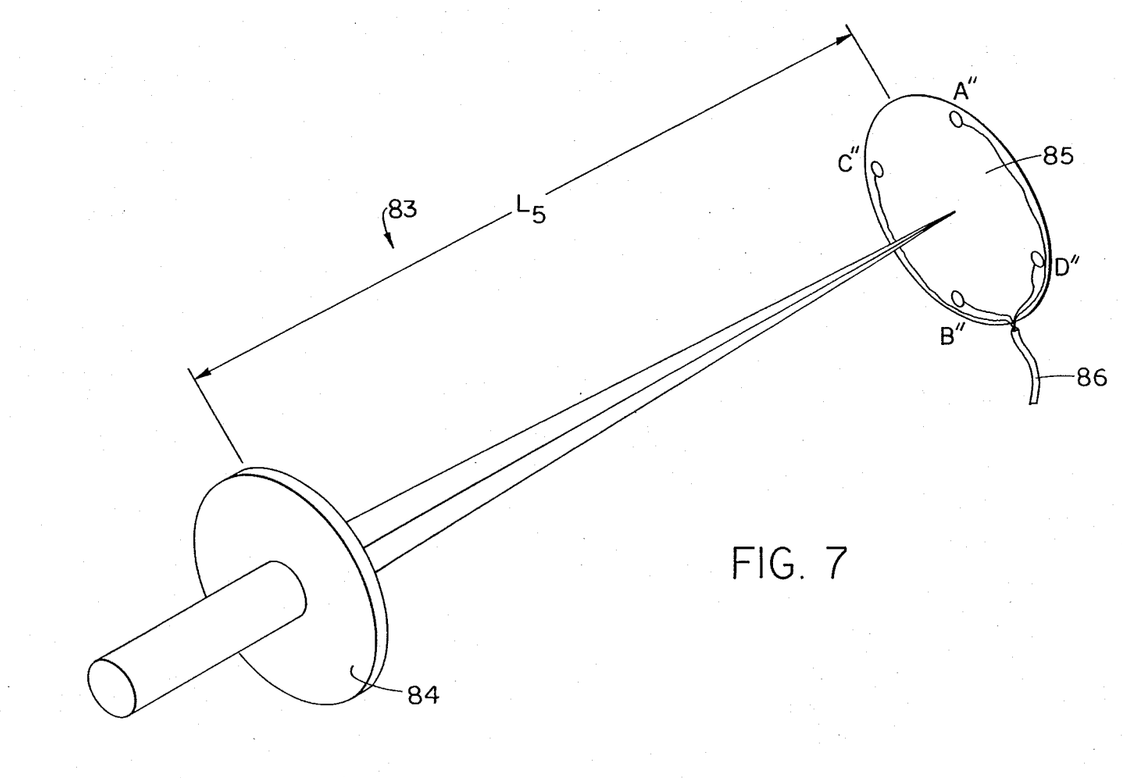
FIG. 7 is an enlarged perspective view showing details of another alternate error detector optic which can be utilized in the laser beam processing packages described herein.

As mentioned, a second portion 69 of laser beam 32 is passed on through beam splitter 61 to means for directing such second portion (preferably pentaprism 68) along beam transmission axis $B_3$. As mentioned above with respect to transmission axis $B_2$, the parallelism of transmission axis $B_3$ to the third axis (i.e. the Z axis) of the triordinate system is known since the angular deviations of second processing package 60 about the Y and Z axes are known. FIG. 3 illustrates a side view schematic of pentaprism 68 and third laser beam processing package 80, which is located along the beam transmission axis $B_3$ of second portion 69 of the laser beam adjacent working piece 17 of positioning device 10. Second portion 69 of laser beam 32 is thereby directed from second laser beam processing package 60 to third processing package 80, which includes a beam splitter 81 which directs a portion of the entering beam 69 to a second beam splitter 82, which further subdivides the entering laser beam, directing a subportion to a fifth error detector means 83 for measuring the angular deviations of the second portion 69 of the laser beam relative the X and Y axes of the triordinate system, and another subportion to a sixth error detector means for measuring the translational deviations of laser beam 32 relative the X and Y axes of the triordinate system. As shown in FIG. 7, fifth detector means 83 preferably comprises a spherical lens 84 which is located at its focal length $L_5$ from position sensor 85. Since the beam is focused in both axes of lens 84, no translational deviations affect the position of the beam on sensor 85. Therefore, the photocurrents delivered to the four electrodes A" through D" of sensor 85 determine the angular deviations of processing package 80 about the X and Y axes.

Figure 6:
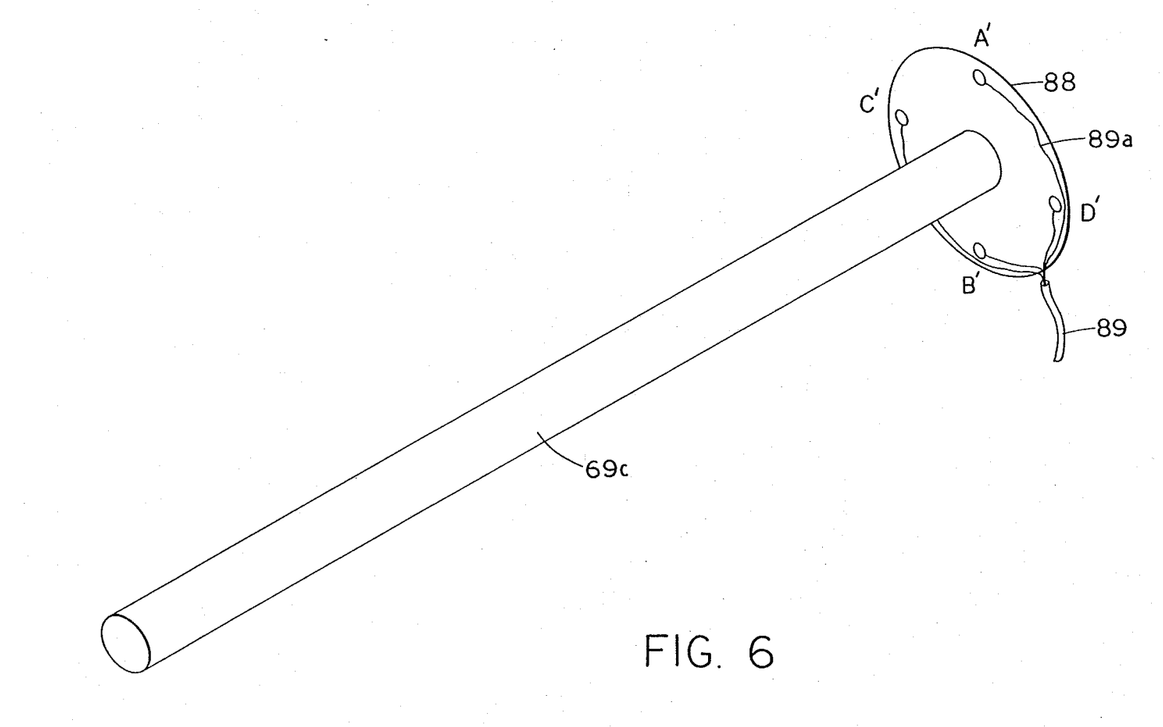
FIG. 6 is an enlarged perspective view showing details of yet another error detector optic which can be utilized in the laser beam processing packages described herein.

Sixth error detector means 88 comprises a dual axis position sensor as described above, and as illustrated in greater detail in FIG. 6. Subportion 69c of the laser beam is directed by beam splitter 82 to impinge sensor 88, whereby the translational deviations of processing package 80 relative the X and Y axes can be directly determined by the photocurrent delivered to the four electrodes $A^1$ through $D^1$.

Similarly, a portion of the laser beam passing through beam splitter 81 is directed to a seventh error detector means 90 which is substantially identical to the second and fourth error detector means 50 and 70, respectively, described above. Seventh detector means 90 includes polarizing beam splitter 92, and a pair of corresponding spherical lenses 93 spaced at their focal length $l_6$ from intensity sensors 94, as shown. Detector means 90 again utilizes the polarization of laser beam 32 to detect roll errors of the laser beam relative the Z axis of the triordinate system. Angular errors detected by fifth detector means 83 are fed back to the central control unit 18 via feedback lines 86 and feedback processing means 87; translational errors detected by sixth detector means 88 are fed to feedback processing means 87 via line 89; and the roll errors detected by seventh detector means 90 are fed to processing means 87 via feedback lines 95a and b, respectively.

It can therefore be seen that positional errors of working piece 17 of positioning device 10 can be monitored by the position error sensing device 25 shown and described herein with the employment of a single laser beam. Such system utilizes a combination of optics and light sensing devices to split off and measure portions of the laser beam directed along the three major axes of positioning device 10. As described above, the roll, pitch and yaw deviations of working piece 17 is measured by a combination of the three laser beam processing packages integrally mounted in conjunction with the positioning device, as are the translational errors along each of the three mutually perpendicular axes of the triordinate system. Errors detected at each of the three laser beam processing packages are fed back to a central control unit 18 via feedback means 47, 67, and 87, respectively. It should be understood that as described herein, the position error sensing device 25 measures pure errors which can be fed back to the central control unit of the positioning device 10 to enable relatively simple position correction commands on an ongoing basis. It is further contemplated that because the error sensing and feedback apparatus of the subject invention can be integrated into positioning device 10 such that its structure does not substantially interfere with the ordinary operation thereof, the subject error sensing device can advantageously be selectively used as desired with such system. As used herein, the term "selective" should be understood to indicate that the subject error sensing apparatus and method can be employed intermittently or continuously in accordance with the performance needs of the particular application. Moreover, it should be noted that the unique structure of the subject invention enables its integration and use with a positioning device without requiring cumbersome measuring and monitoring systems which often interfere with the work space and/or normal operation of a particular positioning device.

While it is preferred that the means for directing portions of the laser beam from one processing package to another be pentaprism structures, it is understood that Abbe error will enter the system as the processing packages are slightly rotated about the entering and exiting beam axes. It should be noted, however, that the deviations detected by the three laser beam processing packages described herein provide the data necessary for correcting such Abbe errors when combined with axis position data from the control unit 18 of positioning device 10.

For example, the Abbe error in the measurement of X deviation equals the laser beam travel length from pentaprism 68 to the intensity sensor of sixth detector means 88 multiplied by the sine of the angular deviation of the beam about the Y axis. For the system shown in FIG. 1, the laser beam travel length is the distance between processing packages 60 and 80 when the Z axis position equals zero (i.e. when working piece 17 is located at its untranslated Z position), minus the instantaneous Z axis position, as preferably determined by a standard coordinate resolver system of positioning device 10. The angular deviation of the beam is determined by the measured angular deviations of processing package 60. This Abbe error must be subtracted from the X translation error detected by the sixth detector means 88.

Similar Abbe errors in the Y and Z directions are also calculated and processed along with the translational, angular and roll errors described above. The position error sensing device and method for determining and feeding back deviations in a three axis system is designed to measure pitch, yaw, roll, and translational errors along each of the axes of the triordinate system.

An additional Abbe error is generated by the rotation of processing packages 40 and 60 about the Z and X axes, respectively. This error can be reduced to negligible levels in robotic applications by proper placement of the optics within the processing packages. In the case of a coordinate measuring system, the need for higher accuracy necessitates measuring and correcting for this additional Abbe error. In such an application, error detector means 43 and 63 would preferably each be replaced by a beam splitter similar to beam splitter 82, a spherical lens similar to lens 84, and two position sensors similar to sensors 85 and 88. These components would be arranged in a manner similar to error detector means 83 and 88 to measure such errors.

While the position error sensing and feedback apparatus of the subject invention has been specifically described in conjunction with a gantry-type robot, it should be noted that the unique teachings and capabilities of the subject invention can equally be utilized in conjunction with virtually any positioning device which moves its working piece in a rectilinear system of up to three mutually perpendicular axes. As mentioned above, an alternative application would be in a coordinate measuring system or similar device wherein the self-teaching or constant error detection and correction capabilities of the subject apparatus and method would be helpful. A further advantage of the subject apparatus and method is that it can be relatively easily integrated into the existing control unit for a positioning device. Such integration is facilitated by the isolated or pure nature of the errors detected by the subject system. Required offset corrections can be directly fed into the control system from the individual feedback means (e.g. 47, 67 and 87) of the various laser processing packages of the system.

Modifications of the described system and method can also be made to adapt the same to positioning devices having less than three axes of movement. For example, a positioning device having only two axes (e.g. having Y and Z axes) of motion could be accomplished by simply removing the first laser beam processing package 40 described herein, and directing the polarized laser beam from laser source 30 directly toward the second laser beam processing package 60 along transmission axis $B_2$ parallel to the Y axis. Another preferred modification to the subject system might be the enclosure of laser beam 32 along its axes of transmission $B_1$, $B_2$, and $B_3$ within a housing for safety and to minimize environmental effects on the laser itself (e.g. dust particles and other extraneous influences). In this regard, the laser beam might be directed within hollow structural members of a particular positioning device to provide a substantially enclosed integral system therewithin. It is also contemplated that the error sensing and feedback apparatus and method described herein could similarly be successfully employed to monitor and improve the accuracy of servo-controlled systems for various laser applications. The subject error sensing system could also be combined with appropriate interferometer apparatuses to measure errors in the direction of the axis movement of a particular rectilinear positioning device. While such combination would substantially add to the cost of the system contemplated herein, the increased precision in detecting errors in the direction of the axis of movement of a particular positioning device could provide impetus for justifying such costs.

An additional processing package could also be mounted adjacent the laser source to monitor the beam orientation, position, and polarization. This would increase the accuracy of the entire system over that attainable with the standard laser pointing stability. Such a processing package would preferably incorporate error detecting means such as those shown in FIGS. 5, 6, and 7.

Having shown and described the preferred embodiment of the present invention, further adaptions of the error sensing and feedback apparatus and method described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. A position error sensing and feedback apparatus for a positioning device having a working piece which is moved along a rectilinear multi-ordinate system, said apparatus comprising:
   (a) a laser source for providing a highly polarized laser beam of a predetermined wavelength, said laser source being supported at a predetermined position relative said rectilinear positioning device, and said beam being fixedly directed substantially parallel to one of the axes of said rectilinear system;
   (b) means for measuring positional errors of said working piece by receiving and processing said laser beam, said error measuring means comprising means for splitting the highly polarized laser beam to direct portions thereof to a plurality of error detecting devices, said error detecting devices including a first detector for measuring translational deviation of said measuring means relative to said polarized beam and, therefore, relative one or more of the individual axes of said rectilinear system, a second detector for measuring angular deviation of said measuring means polarized beam and, therefore, relative one or more of said axes, and a third detector for measuring roll deviation of said measuring means relative said polarized beam about said beam along the axis of transmission;
   (c) feedback means for communicating detected translational, angular and rotational deviations to a control unit of said rectilinear positioning device to enable selective correction of said deviations and to thereby provide improved positional accuracy of said working piece.

2. The position error sensing and feedback apparatus of claim 1, wherein said rectilinear multi-ordinate system comprises a three axis triordinate system, wherein said three axes are mutually perpendicular to one another.

3. The position error sensing and feedback apparatus of claim 2, wherein said error measuring means further comprises a plurality of laser beam processing packages for receiving and measuring said highly polarized laser beam, each of said processing packages being located on said positioning device along one of the mutually perpendicular axes of said triordinate system, whereby said laser beam is directed to one of said processing packages from said laser source substantially parallel to one of said axes, and thereafter transmitted to successive processing packages along successive paths substantially parallel to said other axes, respectively.

4. The position error sensing and feedback apparatus of claim 3, wherein some of said processing packages include means for directing an incoming laser beam outwardly along a beam axis which is oriented 90° from the incoming beam transmission axis toward a subsequent processing package.

5. The position error sensing and feedback apparatus of claim 4, wherein said beam directing means comprises a single reflecting surface device.

6. The position error sensing and feedback apparatus of claim 4, wherein said beam directing means comprises a pentaprism structure.

7. The position error sensing and feedback apparatus of claim 1, wherein said laser source provides a highly polarized beam of the He-Ne type at a predetermined stable wavelength.

8. The position error sensing and feedback apparatus of claim 1, further comprising means for monitoring the position, orientation and polarization of said laser beam provided by said laser source.

9. The position error sensing and feedback apparatus of claim 1, wherein said positioning device comprises a gantry-type robot for manipulating a working piece along a rectilinear three axis system.

10. The position error sensing and feedback apparatus of claim 1, wherein said positioning device comprises a coordinate measuring system.

11. The position error sensing and feedback apparatus of claim 1, wherein the path along which said laser beam is directed is substantially enclosed along its entire length.

12. The position error sensing and feedback apparatus of claim 1, wherein said apparatus is integrated into said positioning device such that its structure does not substantially interfere with the ordinary operation of said device, and wherein said apparatus can be selectively utilized in conjunction with the operation of said device.

13. The position error sensing and feedback apparatus of claim 1, wherein said feedback means can be interfaced with the standard controls of said positioning device to provide error correction capabilities thereto.

14. The position error sensing and feedback apparatus of claim 3, wherein a first laser beam processing package is located along a first axis of said triordinate system, said first processing package comprising means for splitting said laser beam in order to permit the direction of a first portion thereof along a path substantially parallel to a second axis of said triordinate system, and to direct the remaining portion of said laser beam to error detector means for measuring positional and orientational errors of said first processing package relative said laser beam.

15. The position error sensing and feedback apparatus of claim 14, wherein a second laser beam processing package is located along said second axis of said triordinate system for receiving the first portion of said laser beam directed from said first processing package, said second processing package comprising means for further splitting said first portion of said laser beam in order to permit the direction of a second portion thereof along a path substantially parallel to the third axis of said triordinate system, and to enable direction of the remaining portions thereof to error detector means for measuring positional and orientational errors of said second processing package relative said first portion of said laser beam.

16. The position error sensing and feedback apparatus of claim 15, wherein a third laser beam processing package is located along said third axis of said triordinate system for receiving the second portion of said laser beam directed from said second processing package, said third processing package comprising means for directing portions of the second portion of said laser beam to a plurality of error detector means for measuring positional and orientational errors of said third processing package relative said second portion of said laser beam.

17. A position error sensing and feedback apparatus for a positioning device having a working piece which is moved along a rectilinear triordinate system of three mutually perpendicular axes, said apparatus comprising:
(a) a reference laser source providing a highly polarized laser beam of a predetermined wavelength, said laser source being supported at a predetermined position relative said rectilinear positioning device, and said beam being directed substantially parallel to a first one of the axes of said triordinate system;
(b) a first laser beam processing package located along said first axis for receiving said laser beam and comprising means for splitting said laser beam in order to permit the direction of a first portion thereof along a path substantially parallel to a second axis of said triordinate system, and to direct the remaining portion of said laser beam to at least one error detector means for measuring positional and orientational errors of said first processing package relative said laser beam;
(c) a second laser beam processing package located along said second axis for receiving the first portion of said laser beam directed from said first processing package, said second processing package comprising means for further splitting said first portion of said laser beam in order to permit the direction of a second portion thereof along a path substantially parallel to the third axis of said triordinate system, and to direct the remaining portions thereof to at least one error detector means for measuring positional and orientational errors of said second processing package relative said first portion of said laser beam;
(d) a third laser beam processing package located along said third axis of said triordinate system for receiving the second portion of said laser beam directed from said second processing package, said third processing package comprising means for directing portions of the second portion of said laser beam to a plurality of error detector means for measuring positional and orientational errors of said third processing package relative said second portion of said laser beam; and (e) feedback means for communicating the detected positional and orientational errors to a control unit of said rectilinear positioning device to enable correction of said deviation and to thereby provide improved positional accuracy of said working piece.

18. The positional and orientational error sensing and feedback apparatus of claim 17, wherein said first and second processing packages include means for directing an incoming laser beam outwardly along a beam axis which is oriented 90° from the incoming beam axis and toward a subsequent processing package.

19. The positional and orientational error sensing and feedback apparatus of claim 18, wherein said beam directing means comprises a single reflecting surface device.

20. The positional and orientational error sensing and feedback apparatus of claim 18, wherein said beam directing means comprises a pentaprism structure.

21. The positional and orientational error sensing and feedback apparatus of claim 18, wherein said error detector means of said processing packages further measure deviations of said reference laser beam and its first and second portions caused by said beam directing means, whereby such beam deviations can be compensated for.

22. The positional and orientational error sensing and feedback apparatus of claim 17, wherein said laser source provides a highly polarized beam of He-Ne type at a predetermined stable wavelength.

23. The positional and orientational error sensing and feedback apparatus of claim 17, wherein said means for splitting the highly polarized laser beam comprises at least one neutral density filter.

24. The positional and orientational error sensing and feedback apparatus of claim 17, wherein said error detector means comprises optical structures for measuring angular and translational deviations relative said polarized laser beam, as well as rotational deviations relative the transmission axes of said polarized beam.

25. A positional and orientational error sensing and feedback apparatus for a positioning device having a working piece which is moved along a rectilinear triordinate system of three mutually perpendicular axes, said apparatus comprising:

(a) a reference laser source for providing a highly polarized laser beam of a predetermined wavelength, said laser source supported at a predetermined position relative to and independent of said rectilinear positioning device, and said laser beam being directed substantially parallel to a first one of said mutually perpendicular axes;

(b) a first laser beam processing package located on said positioning device along said first axis for receiving said laser beam, said first processing package comprising means for splitting said laser beam to enable direction of a first portion thereof along a path substantially parallel to a second one of said mutually perpendicular axes, another portion toward first detector means for measuring angular deviation and translation deviation of said first processing package relative said polarized beam, and another portion toward second detector means for measuring rotational deviation of said first processing package relative said polarized beam about the laser beam axis parallel to said first axis;

(c) a second laser beam processing package located on said positioning device along said second axis perpendicular to said first axis for receiving the first portion of said laser beam directed from said first processing package, said second processing package comprising means for splitting said first portion of said laser beam to enable direction of a second portion of the beam along a path substantially parallel to the third of said mutually perpendicular axes, another portion toward third detector means for measuring angular deviation and translational deviation of said second processing package relative said first portion of the polarized beam, and another portion toward fourth detector means for measuring rotational deviation of said second processing package relative said first portion of said laser beam about its beam axis parallel to said second axis;

(d) a third laser beam processing package located on said positioning device adjacent said working piece along said third axis perpendicular to said second axis for receiving the second portion of said laser beam directed from said second processing package, said third processing package comprising means for splitting said second portion of said laser beam to direct a portion thereof toward a fifth detector means for measuring angular deviations of said third processing package relative said second portion of said laser beam, a portion toward a sixth detector means for measuring translational deviations of said third processing package relative said second portion of said laser beam, and a portion toward a seventh detector means for measuring rotational deviation of said third processing package relative said second portion of said laser beam about its beam axis parallel to said third axis; and (e) feedback means for communicating the detected translational, angular and rotational deviations to a control unit of said rectilinear positioning device to enable correction of said deviations and to thereby provide improved positional and orientational accuracy of said working piece.

26. A method for detecting and correcting positional and orientational errors in a positioning device having a working piece which is moved along a rectilinear triordinate system, said method comprising the following steps:

(a) directing a highly polarized reference laser beam of predetermined wavelength along a first beam axis substantially parallel to a first one of the axes of said triordindate system;

(b) receiving said laser beam in a first laser beam processing package located along said first axis of said triordinate system, and processing said laser beam by splitting the same into a first portion which is to be directed outwardly from said first processing package along a path substantially parallel to a second axis of said triordinate system, and by directing the balance of said laser beam to error detector means for measuring positional and orientational errors of said first processing package relative said laser beam;

(c) receiving said first portion of said laser beam directing from said first processing package in a second laser beam processing package located along said second axis of said triordinate system, and processing said first portion by splitting the same into a second portion which is to be directed outwardly from said second processing package along a path substantially parallel to the third axis of said triordinate system, and by directing the balance of said first portion to error detector means for measuring positional and orientational errors of said second processing package relative said first portion of said laser beam;

(d) receiving said second portion of said laser beam directed from said second processing package in a third laser beam processing package located along said third axis of said triordinate system, and processing said second portion by directing the same to error detector means for measuring positional and orientational errors of said third processing package relative said second portion of said laser beam; and (e) feeding all of the positional and orientational errors detected at said first, second and third processing packages to a positioning device control unit to enable offsetting corrections to be made to said working piece.

27. The method of claim 26, wherein said second portion of said laser beam directed from said second processing package is processed by splitting said second portion into a plurality of subportions, and directing said subportions to a plurality of error detector means for measuring positional and orientational errors of said second processing package relative said second portion of said laser beam.

28. The method of claim 26, wherein said first and second portions of said laser beam are directed from said first and second processing packages, respectively, by passing said portions through first and second pentaprism structures, respectively, to change the direction of such beam portions by 90°, thereby directing such beam portions toward the second and third laser beam processing packages, respectively.

29. The method of claim 26, including the additional step of utilizing the positional and orientational errors detected at said processing packages to determine the deviations of the first and second portions of the reference laser beam caused by the optics utilized to direct the beam from one processing package to another along the axes of the triordinate system, whereby such beam deviations can be compensated for by offsetting corrections.

30. The method of claim 26, including the additional step of monitoring the position and orientation of said polarized reference laser beam as it is directed from its source, whereby positional and orientational deviations of said beam can be determined and factored into said positional and orientational errors detected at said first, second and third processing packages and into the offsetting corrections therefor.

31. The method of claim 26, further comprising the step of making offsetting corrections for the positional and orientational errors detected to thereby improve the positional and orientational accuracy of said working piece in said triordinate system

* * * * *